United States Patent [19]
Gotoh

[11] Patent Number: 5,466,984
[45] Date of Patent: Nov. 14, 1995

[54] IMPLOSION-RESISTANT BAND WITH STACK RETAINER

[75] Inventor: Hiroyuki Gotoh, Gihu, Japan

[73] Assignee: Sony Corporation, Tokyo, Japan

[21] Appl. No.: 321,590

[22] Filed: Oct. 12, 1994

Related U.S. Application Data

[63] Continuation of Ser. No. 995,148, Dec. 22, 1992, abandoned.

[30] Foreign Application Priority Data

Dec. 26, 1991 [JP] Japan ................................. 3-344499

[51] Int. Cl.⁶ .................................................. H01J 29/87
[52] U.S. Cl. ................. 313/477 R; 313/482; 220/2.1 A; 348/821; 348/822
[58] Field of Search ............................... 313/477 R, 482; 220/2.1 A, 2.3 A; 348/818, 821, 822

[56] References Cited

U.S. PATENT DOCUMENTS

| | | | |
|---|---|---|---|
| 4,356,515 | 10/1982 | Sumiyoshi et al. | 220/2.1 A |
| 4,586,087 | 4/1986 | Parsons et al. | 358/246 |
| 4,668,993 | 5/1987 | Hermann | 220/2.1 A |
| 5,216,513 | 6/1993 | Swank | 220/2.1 A |

FOREIGN PATENT DOCUMENTS

| | | | |
|---|---|---|---|
| 0421537 | 4/1991 | European Pat. Off. | 313/482 |
| 0111935 | 7/1982 | Japan | 358/246 |
| 0062039 | 4/1985 | Japan | 313/477 R |

*Primary Examiner*—Sandra L. O'Shea
*Assistant Examiner*—Vip Patel
*Attorney, Agent, or Firm*—Hill, Steadman & Simpson

[57] ABSTRACT

An implosion-resistant band on a screen panel of a cathode-ray tube body has a metallic band element having a plurality of corners, and a plurality of holders mounted respectively on the corners. Each of the holders includes a flange held against and welded to one of the corners, an attachment arm bent from one edge of the flange, and a stack retainer extending from an opposite edge of the flange and offset out of contact with the metallic band element. The retainer has a central recess opening away from the attachment arm.

15 Claims, 5 Drawing Sheets

IMPLOSION-RESISTANT BAND WITH STACK RETAINER

This is a continuation, of application Ser. No. 07/995,148, filed Dec. 22, 1992, now abandoned.

BACKGROUND OF THE INVENTION

1. Field of the Invention

The present invention relates to an implosion-resistant band for protecting a cathode-ray tube from implosion, and a cathode-ray tube having such an implosion-resistant band.

2. Description of the Prior Art

Heretofore, as shown in FIG. 1 of the accompanying drawings, a conventional cathode-ray tube comprises a tube body 4 composed of a screen panel 1, a funnel 2, and a neck 3, and an annular implosion-resistant band 5 wound around the screen panel 1 under certain tension for protecting the tube body 4 from implosion. The conventional implosion-resistant band 5 comprises an annular metallic frame or band element 6 and a plurality of holders 7 welded to respective four corners thereof that are snugly fitted respectively over the corners of the screen panel 1. When the cathode-ray tube is placed in a housing such as a television set cabinet, for example, the holders 7 are fastened to the cabinet to support the cathode-ray tube securely in the cabinet.

The implosion-resistant band 5 is usually shrink-fitted over the screen panel 1. More specifically, the band element 6 is first heated to expand its bore, and then put around the screen panel 1. Thereafter, the band element 6 is rapidly cooled so that it is contracted and clamped firmly around the screen panel 1.

As shown in FIG. 2, each of the holders 7 that are welded respectively to the four corners of the band element 6 comprises a flange 9 held flatwise against and spot-welded to one of the corners at three spots P, and an attachment arm 10 extending perpendicularly from one edge of the flange 9 and having an attachment hole 10a for attaching the holder 7 to the cabinet.

In FIG. 1, the annular band element 6 has a marginal edge folded over on itself, providing a partial double-walled band structure. The holders 7 are welded to the portion of the annular band element 6 which is not folded over.

For shipment of implosion-resistant bands of the conventional design, they cannot be stacked one upon another as they tend to collapse during shipment. Therefore, the implosion-resistant bands should be packaged one by one and with care exercised not to deform them. The efficiency of shipment of implosion-resistant bands is poor as each implosion-resistant band is required to be packaged individually.

Unpackaging implosion-resistant bands and then supplying unpackaged implosion-resistant bands for the manufacture of cathode-ray tubes have been inefficient because these processes have been manually carried out.

OBJECTS AND SUMMARY OF THE INVENTION

It is therefore an object of the present invention to provide an implosion-resistant band which is of such a structure as to permit a plurality of implosion-resistant bands to be shipped as being stacked one upon another.

Another object of the present invention is to provide a cathode-ray tube which has the above implosion-resistant band for protection against implosion.

According to the present invention, there is provided an implosion-resistant band for use on a screen panel of a cathode-ray tube body, comprising a metallic band element having a plurality of corners, and a plurality of holders mounted respectively on the corners, each of the holders comprising a flange held against and welded to one of the corners, an attachment arm bent from one edge of the flange, and a stack retainer extending from an opposite edge of the flange and offset out of contact with the metallic band element.

According to the present invention, there is also provided a cathode-ray tube comprising a tube body comprising a screen panel, a funnel joined to the screen panel, and a neck connected to the funnel, and an implosion-resistant band comprising a metallic band element fitted over the screen panel and having a plurality of corners, and a plurality of holders mounted respectively on the corners, each of the holders comprising a flange held against and welded to one of the corners, an attachment arm bent from one edge of the flange, and a stack retainer extending from an opposite edge of the flange and offset out of contact with the metallic band element.

The retainer has a recess defined therein. The recess is defined centrally in the retainer and opens away from the attachment arm.

The above and other objects, features, and advantages of the present invention will become apparent from the following description of illustrative embodiments thereof to be read in conjunction with the accompanying drawings, in which like reference numerals represent the same or similar objects.

DETAILED DESCRIPTION OF THE PREFERRED EMBODIMENT

Figure 1:
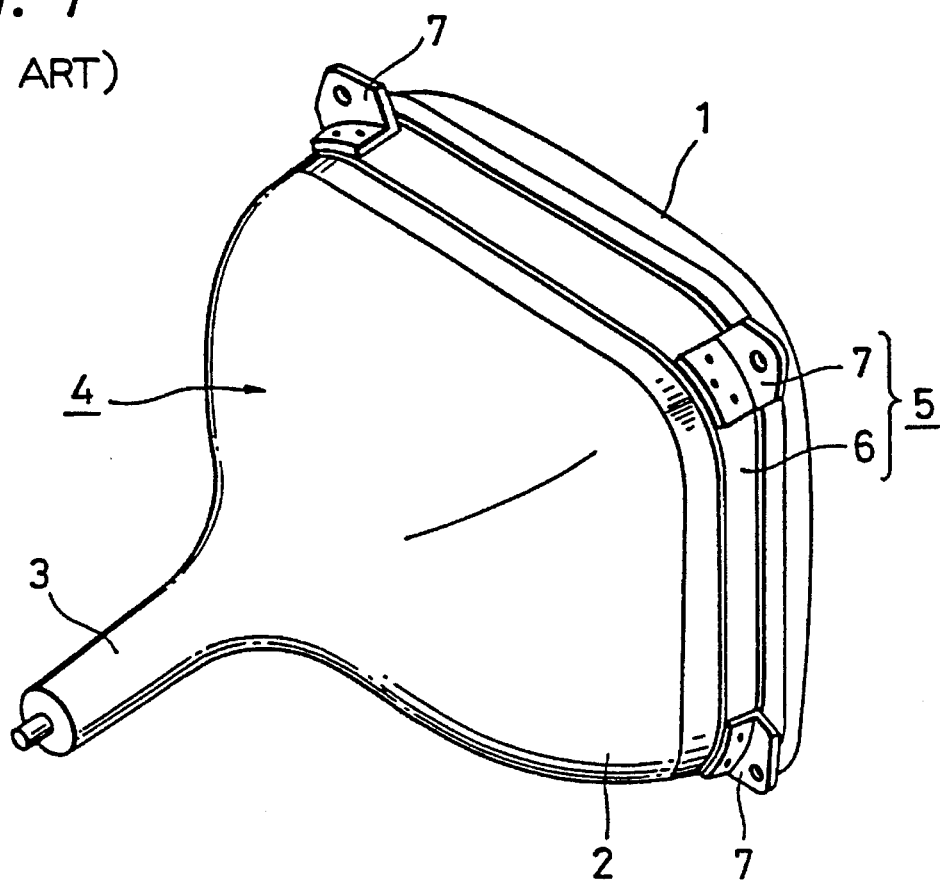
FIG. 1 is a perspective view of a cathode-ray tube with a conventional implosion-resistant band.
Figure 2:
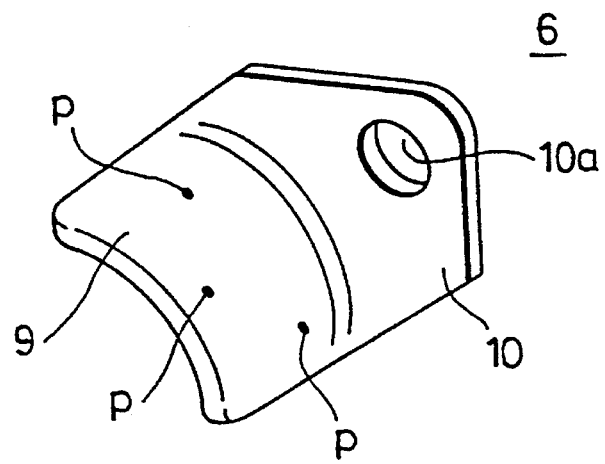
FIG. 2 is a perspective view of a holder of the conventional implosion-resistant band shown in FIG. 1.
Figure 3:
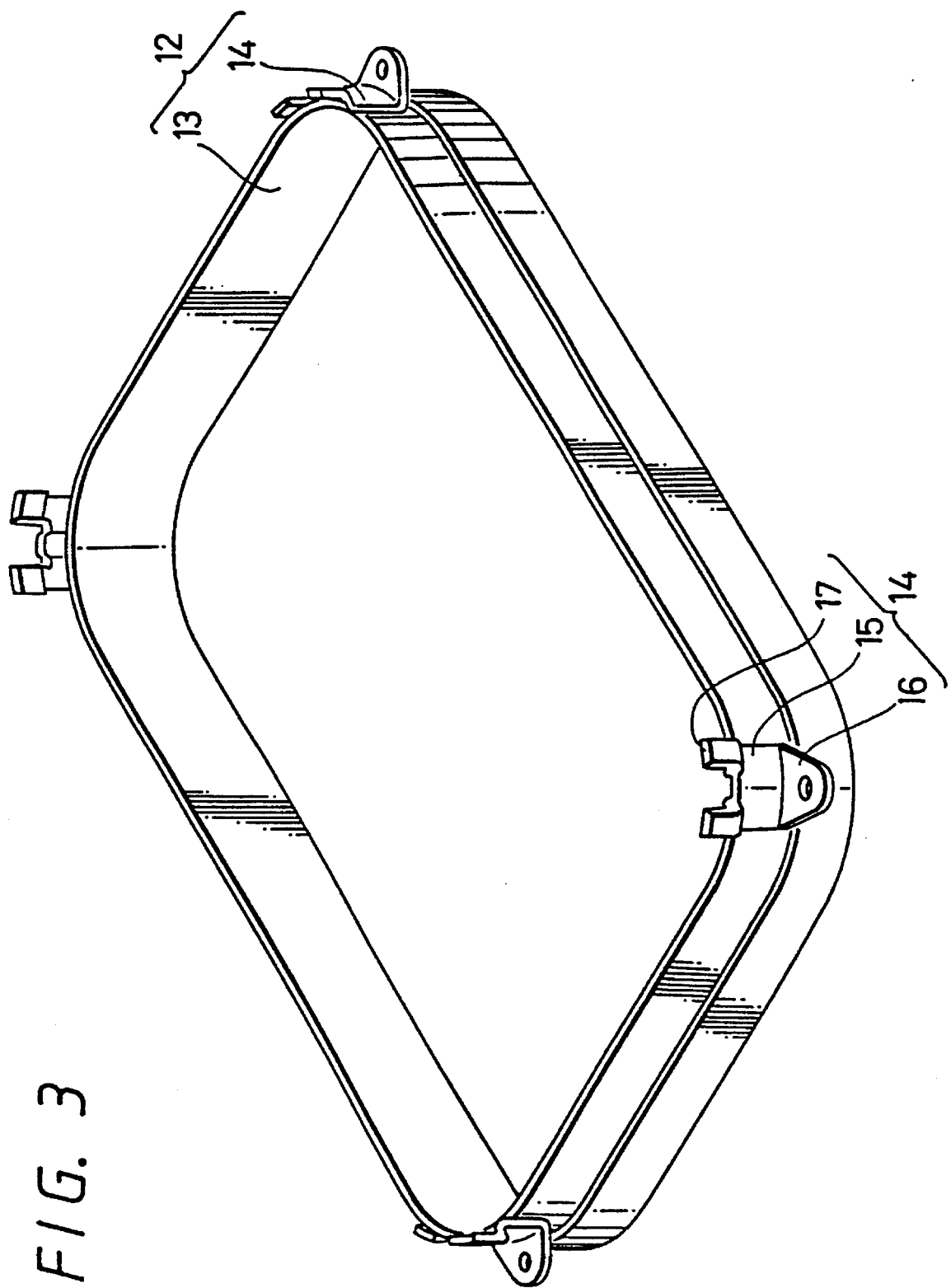
FIG. 3 is a perspective view of an implosion-resistant band according to the present invention.

As shown in FIG. 3, an implosion-resistant band 12 according to the present invention comprises an annular metal frame or band element 13 and four holders 14 attached to the outer sides of respective four corners of the annular band element 13. The annular band element 13 has a marginal edge folded over on itself, providing a partial double-walled band structure. The holders 14 are welded to the portion of the annular band element 13 which is not folded over.

Figure 4:
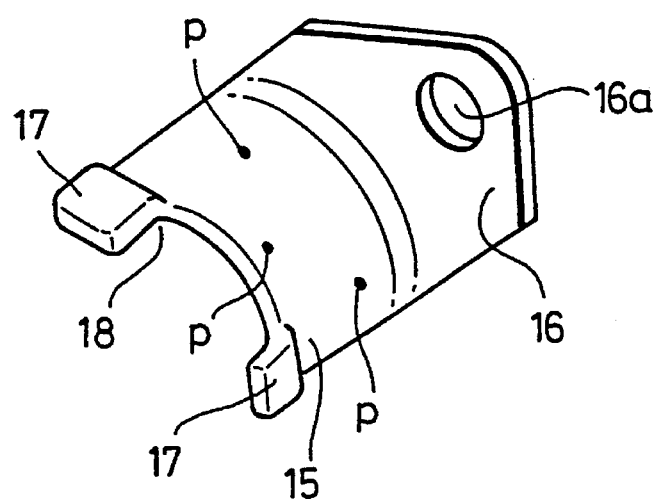
FIG. 4 is a perspective view of a holder of the implosion-resistant band shown in FIG. 3.

As shown in FIG. 4, each of the holders 14 comprises an arcuate flange 15 held against and spot-welded to one of the corners at three spots P, an attachment arm 16 extending substantially perpendicularly from one edge of the flange 15 and having an attachment hole 16a for attaching the holder 14 to a housing such as a television set cabinet, for example, and a stack retainer 17 extending from an opposite edge of the flange 15 parallel thereto and offset laterally from the flange 15 away from the band element 13 with a step interposed between the stack retainer 17 and the flange 15. The stack retainer 17 has a recess 18 defined centrally therein and opening away from the attachment arm 16 for facilitating the insertion of a bolt into the attachment hole 16a.

Each holder 14 is spot-welded to the band element 13 such that the stack retainer 17 is positioned upwardly of the upper edge of the band element 13 as shown in FIG. 3.

Figure 5:
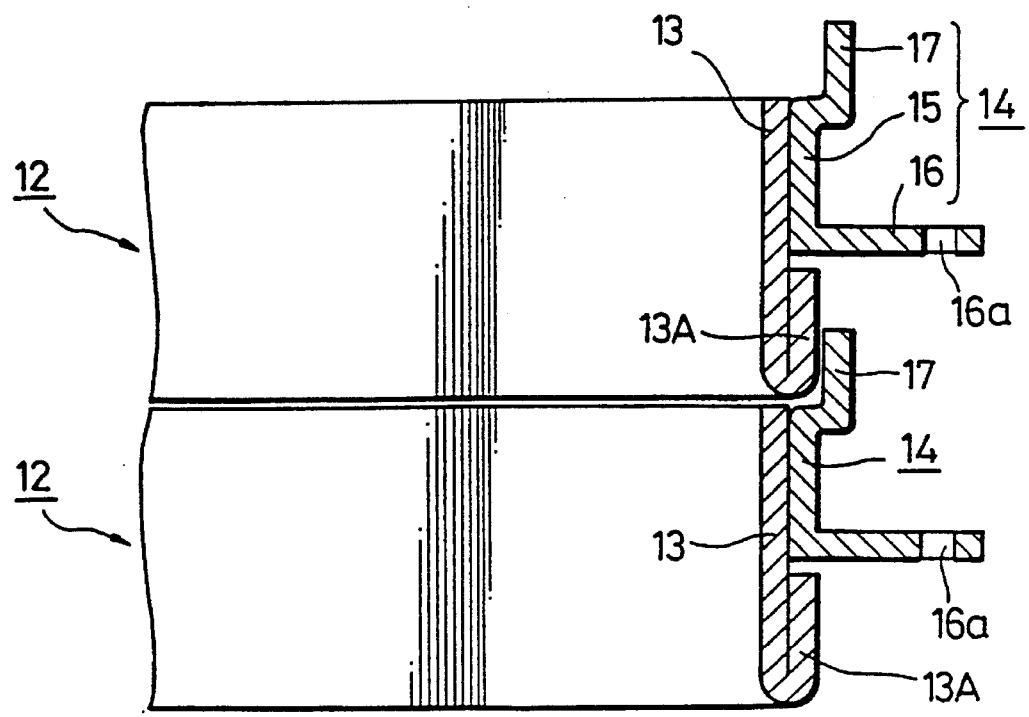
FIG.-5 is an enlarged fragmentary cross-sectional view of stacked implosion-resistant bands according to the present invention.

When a plurality of implosion-resistant bands 12 are stacked one upon another, as shown in FIG. 5, the outer layer of a folded portion 13A of an upper implosion-resistant band 12 is positioned inwardly of and guided by the stack retainers 17 of the holders 14 of a lower implosion-resistant band 12. In this manner, each of the implosion-resistant bands 12, except the lowermost one, can be stably retained by the stack retainers 17 of an implosion-resistant band 12 positioned immediately therebeneath. The implosion-resistant bands 12 can therefore remain stably stacked without collapsing.

Figure 6:
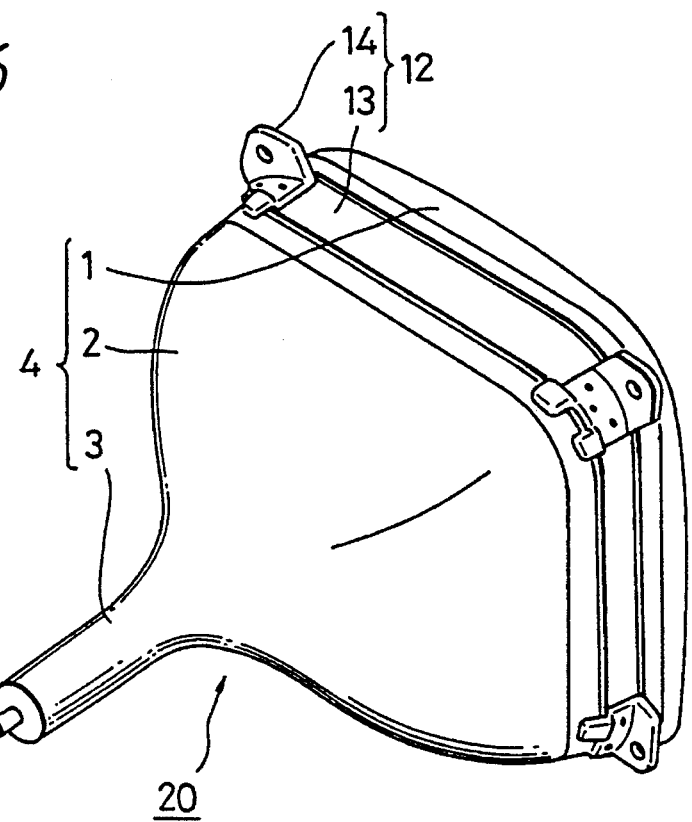
FIG. 6 is a perspective view of a cathode-ray tube according to the present invention.

FIG. 6 shows a cathode-ray tube 20 which is protected from implosion by the implosion-resistant band 12 according to the present invention. The cathode-ray tube 20 has a tube body 4 composed of a screen panel 1, a funnel 2, and a neck 3. The implosion-resistant band 12 is fitted over the screen panel 1. As can be seen from FIG. 6, the implosion-resistant band 12 can easily be shrink-fitted over the screen panel 1 without fail.

The implosion-resistant band 12 can be shrink-fitted over the screen panel 1 by an automatic fitting apparatus.

Figure 7:
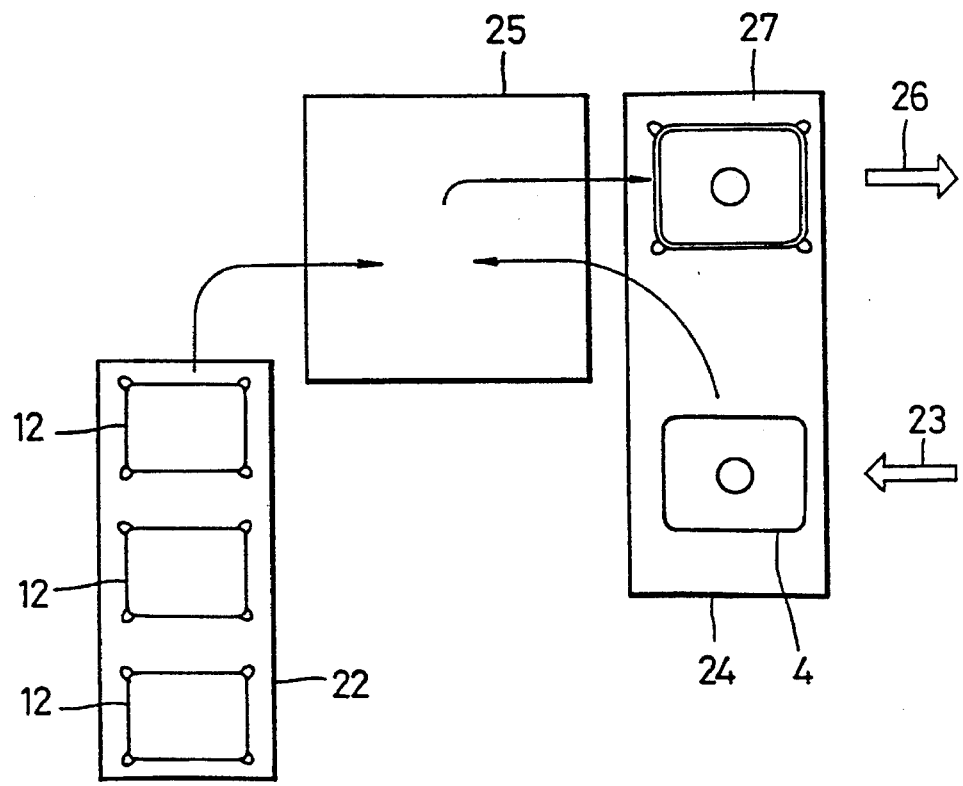
FIG. 7 is a plan view of an apparatus for fitting an implosion-resistant band over a cathode-ray tube body.
Figure 8:
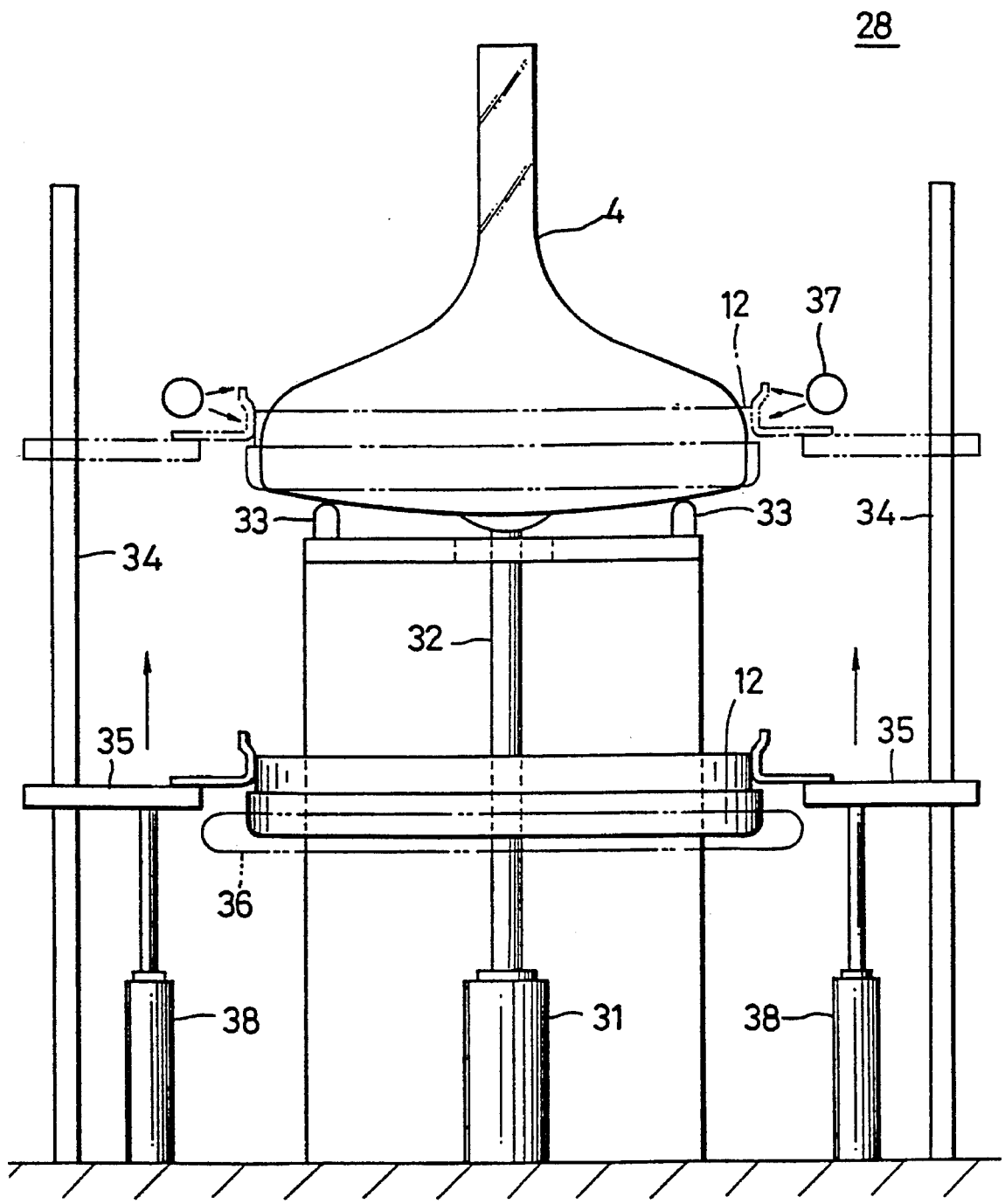
FIG. 8 is an elevational view of an implosion-resistant band clamping machine of the apparatus shown in FIG. 7.

FIGS. 7 and 8 illustrate such an automatic fitting apparatus. As shown in FIG. 7, stacks of implosion-resistant bands 12 are fed to a band supply unit 22. Cathode-ray tube bodies 4 are fed to a cathode-ray tube body supply unit 24 by a conveyor belt in the direction indicated by the arrow 23. The automatic fitting apparatus also has a fitting unit 25 comprising an implosion-resistant band clamping machine 28 (see FIG. 8) for clamping an implosion-resistant band 12 on a tube body 4, and a transfer machine for chucking implosion-resistant bands 12, one at a time, from the band supply unit 22, transferring the chucked implosion-resistant band 12 to the implosion-resistant band clamping machine 28, and transferring a tube body 4 from the cathode-ray tube body supply unit 24 to the implosion-resistant band clamping machine 28.

As shown in FIG. 8, the implosion-resistant band clamping machine 28 has a lifter 32, which is vertically movable by cylinders 31, for supporting a tube body 4 thereon, a plurality of tube body rests 33 for holding the tube body 4 thereon, and a plurality of lifters 35, which are vertically movable along respective guide shafts 34, for supporting and vertically moving an implosion-resistant band 12 around the lifter 32. The implosion-resistant band clamping machine 28 also has a heating unit 36 such as a high-frequency coil for heating and expanding the implosion-resistant band 12 in a position below the lifted tube body 4, and a cooling unit 37 such as a cooling air ejector for cooling the implosion-resistant band 12 in a position where the implosion-resistant band 12 is fitted over the tube body 4 lifted by the lifter 32 and placed on the tube body rests 33.

The automatic fitting apparatus operates as follows: First, implosion-resistant bands 12 are delivered one at a time from the band supply unit 22 onto the lifter 35 by the transfer machine. The lifters 35 support the implosion-resistant band 12 by holding the attachment arms 16 of the holders 14 thereof, and are lifted by the cylinders 38 up to the position where the implosion-resistant band 12 is expanded with heat generated by the heating unit 36.

The tube body 4 fed to the cathode-ray tube body supply unit 24 is placed on the lifter 32, which is then lowered until the tube body 4 is placed on the tube body rests 33.

The implosion-resistant band 12 which has been expanded with heat is elevated by the lifters 35 until the implosion-resistant band 12 is placed around the screen panel 1 of the tube body 4. At the same time that the implosion-resistant band 12 is placed around the screen panel 1, it is rapidly cooled by the cooling unit 37. The implosion-resistant band 12 is contracted and shrink-fitted over the screen panel 1 under tension. The tube body 4 with the implosion-resistant band 12 fitted thereover is thereafter transferred by a transfer machine to a feed unit 27, from which the tube body 4 is fed to another process along the direction indicated by the arrow 27.

As described above, a plurality of stacked implosion-resistant bands 12 according to the present invention can be held together without collapsing by the stack retainers 17 which extend from the flange 15 away from the attachment arm 16 and are offset laterally from the flange 15. When the mass of implosion-resistant bands 12 thus stacked and retained together acts to increase the rigidity of the implosion-resistant bands 12 against deformation. Accordingly, the stacked implosion-resistant bands 12 can easily be shipped without collapsing and deformation.

Since implosion-resistant bands 12 can be stacked one upon another, they can easily be packaged together, and hence can be shipped on a large mesh pallet with high efficiency. Implosion-resistant bands 12 can automatically fitted over cathode-ray tube bodies 4 by the automatic fitting apparatus. Accordingly, a system for manufacturing cathode-ray tubes can be automatized for mass production of implosion-resistant bands 12, and may be reduced in size.

Stacks of implosion-resistant bands 12 can be stored in a relatively small storage space. Storage of stacked implosion-resistant bands 12 is relatively easy.

Cathode-ray tubes 20 with implosion-resistant bands 12 according to the present invention are sufficiently reinforced against implosion, and can easily be attached to cabinets in the same manner as with the conventional cathode-ray tubes.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

What is claimed is:

1. An implosion-resistant band for use on a screen panel of a cathode-ray tube body, comprising:

a metallic band element having a plurality of corners; and a plurality of holders mounted respectively on said corners, each of said holders comprising:

a flange held against and welded to one of said corners;

an attachment arm bent from one edge of said flange, said attachment arm having an aperture for receiving a fastener and extending perpendicularly from a central portion of a width of said metallic band element; and a stack retainer extending from an opposite edge of said flange and offset radially away from said metallic band element, and said retainer extending axially outwardly of said metallic band element.

2. An implosion-resistant band according to claim 1, wherein said retainer has a recess defined therein.

3. An implosion-resistant band according to claim 2, wherein said recess is defined centrally in said retainer and opens away from said attachment arm.

4. An implosion-resistant band according to claim 1, wherein said metallic band element comprises a folded double thickness throughout a portion of its width and said flange is attached to said metallic band element adjacent said double thickness portion with said retainer extending from said flange in a direction away from said double thickness portion, said retainer offset a distance to overfit said double thickness portion of an adjacent stacked band.

5. An implosion-resistant band according to claim 4, wherein said retainer is offset away from said metallic band element a distance equivalent to a single thickness of said double thickness portion.

6. An implosion-resistant band according to claim 1, wherein said attachment arm is bent off from said flange approximately perpendicularly; and said flange is arcuate about an axis generally perpendicular to said attachment arm for fittment around one of said plurality of corners, and said stack retainer comprises two retaining tabs spaced apart by a recess, the tabs extending approximately in two planes perpendicular to each other, said planes approximately defining said one of said corners..

7. An implosion-resistant band according to claim 1, wherein said metallic band element comprises an outwardly folded-over lip creating a double thickness at a front side thereof;

said flanges are arranged fastened to a single thickness of said metallic band recessed from said front side;

said retainers extend past a backside of said metallic band and comprise retaining tabs with a recess therebetween extending rearwardly in each of two planes which define said one of said corners.

8. A cathode-ray tube comprising:

a tube body comprising a screen panel, a funnel joined to said screen panel, and a neck connected to said funnel; and an implosion-resistant band comprising a metallic band element fitted over said screen panel and having a plurality of corners, and a plurality of holders mounted respectively on said corners, each of said holders comprising:

a flange held against and welded to one of said corners;

an attachment arm bent from one edge of said flange having means for connecting to a frame for mounting the cathode-ray tube, and extending perpendicularly from a central portion of a width of said metallic band element; and a stack retainer extending from an opposite edge of said flange and offset away from said metallic band element, and said retainer extending axially outward of said metallic band element.

9. A cathode-ray tube according to claim 8, wherein said retainer has a recess defined therein.

10. A cathode-ray tube according to claim 9, wherein said recess is defined centrally in said retainer and opens away from said attachment arm.

11. A cathode ray tube according to claim 8, wherein said metallic band element comprises a folded double thickness throughout a portion of its width and said flange is attached to said metallic band element adjacent said double thickness portion with said retainer extending from said flange in a direction away from said double thickness portion.

12. A cathode ray tube according to claim 11, wherein said retainer is offset away from said metallic band element a distance equivalent to a single thickness of said band.

13. A cathode ray tube according to claim 8, wherein said attachment arm is bent off from said flange approximately perpendicularly and said means for connecting comprises a bolt hole through a portion thereof for mounting the screen panel; and said flange is arcuate about an axis generally perpendicular to said attachment arm for fittment around one of said plurality of corners, and said stack retainer comprises two retaining tabs spaced apart by a recess, the tabs extending approximately in two planes perpendicular to each other, said planes approximately defining said one of said corners.

14. A cathode ray tube according to claim 8, wherein said metallic band element comprises all outwardly folded-over lip creating a double thickness at a front side thereof;

said flanges are arranged fastened to a single thickness of said metallic band recessed from said front side;

said retainers extend past a backside of said metallic band and comprise retaining tabs with a recess therebetween extending rearwardly in each of two planes which define said one of said corners.

15. An implosion-resistant band for use on a screen panel of a cathode-ray tube body, comprising:

a metallic band element having a single thickness region over a portion of its width, and a double thickness folded region over a remaining portion of its width and having a four rounded corners; and a plurality of holders mounted respectively on said corners, each of said holders including: an arcuate flange held against and welded to one of said corners, an attachment arm bent from one edge of said flange, said attachment arm having an aperture for receiving a fastener extending perpendicularly from a central portion along a width of said metallic band element, and two spaced apart L-shaped retaining tabs, said retainer tabs extending axially outwardly from an opposite edge of said metallic band element, said retaining tabs offset away from said metallic band element a distance slightly greater than a single thickness of said metallic band element to allow a corresponding metallic band element double thickness folded region to be received within an inside perimeter defined by the L-shaped tabs at all four corners, said spaced apart L-shaped retaining tabs providing a clearance therebetween along an axis of said aperture for engagement of a fastener inserted therein by a tool arranged along said axis of said aperture.

* * * * *